United States Patent
Racine et al.

(10) Patent No.: US 12,461,017 B2
(45) Date of Patent: Nov. 4, 2025

(54) VOLTAGE-RESPONSIVE IMAGING ELEMENT FOR SAMPLE-DEPENDENT LIGHT EMISSION, IMAGING DEVICE, IMAGING SYSTEM, ASSOCIATED ANALYSIS METHOD AND MANUFACTURING METHOD

(71) Applicant: COMMISSARIAT À L'ENERGIE ATOMIQUE ET AUX ENERGIES ALTERNATIVES, Paris (FR)

(72) Inventors: Benoit Racine, Grenoble (FR); Olivier Haon, Grenoble (FR); Christelle Laugier, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/751,432

(22) Filed: Jun. 24, 2024

(65) Prior Publication Data
US 2024/0426742 A1 Dec. 26, 2024

(30) Foreign Application Priority Data
Jun. 22, 2023 (FR) ........................ 2306478

(51) Int. Cl.
*G01N 21/01* (2006.01)
*G01N 21/17* (2006.01)
(Continued)

(52) U.S. Cl.
CPC ......... *G01N 21/01* (2013.01); *G01N 21/1717* (2013.01); *G01N 27/60* (2013.01);
(Continued)

(58) Field of Classification Search
CPC .... G01N 21/01; G01N 21/1717; G01N 27/60; G01N 33/4836; G01N 2021/1721; G01N 2021/1765; G01N 2201/0628
See application file for complete search history.

(56) References Cited

U.S. PATENT DOCUMENTS

| 6,501,846 | B1 * | 12/2002 | Dickinson | ........... | G06V 40/1318 |
| | | | | | 345/45 |
| 2005/0285822 | A1 * | 12/2005 | Reddy | .................... | H10K 65/00 |
| | | | | | 345/76 |

(Continued)

FOREIGN PATENT DOCUMENTS

TW    I742106 B  * 10/2021 ............ A61M 21/00

OTHER PUBLICATIONS

Search Report as issued in French Patent Application No. FR2306478, dated Feb. 21, 2024.

(Continued)

*Primary Examiner* — Jennifer D Bennett
*Assistant Examiner* — Erin R Garber
(74) *Attorney, Agent, or Firm* — Pillsbury Winthrop Shaw Pittman LLP

(57) ABSTRACT

An imaging element for analysis of a sample includes an electrode adapted to receive the sample, a light-emitting element, disposed opposite the electrode, and separated from the electrode by an insulating protective layer, a voltage-controlled current source configured to supply current to the light-emitting element and comprising a control electrode electrically connected to the electrode, so that said light-emitting element generates a light wave in response to a voltage coming from the sample.

18 Claims, 8 Drawing Sheets

AA

(51) Int. Cl.
  *G01N 27/60* (2006.01)
  *G01N 33/483* (2006.01)
(52) U.S. Cl.
  CPC ............... *G01N 2021/1721* (2013.01); *G01N 2021/1765* (2013.01); *G01N 33/4836* (2013.01); *G01N 2201/0628* (2013.01)

(56) References Cited

U.S. PATENT DOCUMENTS

| | | | |
|---|---|---|---|
| 2019/0306945 A1* | 10/2019 | Valentine | G09G 3/32 |
| 2022/0057682 A1* | 2/2022 | Suzuki | G02F 1/136286 |
| 2023/0081818 A1* | 3/2023 | Templier | H10F 55/165 257/80 |
| 2023/0333014 A1* | 10/2023 | Rennies | G01J 1/44 |
| 2024/0040867 A1* | 2/2024 | Bang | G09G 3/3233 |

OTHER PUBLICATIONS

Tokuda, T., et al., "Optical and Electric Multifunctional CMOS Image Sensors for On-Chip Biosensing Applications", Materials, vol. 4, No. 1, Dec. 2010, pp. 84-102, XP055347233.
Lambacher, A., et al., "Electrical imaging of neuronal activity by multi-transistor-array (MTA) recording at 7.8 μm resolution," Applied Physics A 79, pp. 1607-1611, (Year: 2004).
Voelker, M., et al., "Signal Transmission from Individual Mammalian Nerve Cell to Field-Effect Transistor," $2^{nd}$ Advanced Optical Metrology Compendium, Small, vol. 1, No. 2, (Year: 2005), pp. 206-210.
Preliminary Search Report and Written Opinion as issued in French Patent Application No. FR2306478, dated Feb. 21, 2024.

* cited by examiner

AA

BB

VOLTAGE-RESPONSIVE IMAGING ELEMENT FOR SAMPLE-DEPENDENT LIGHT EMISSION, IMAGING DEVICE, IMAGING SYSTEM, ASSOCIATED ANALYSIS METHOD AND MANUFACTURING METHOD

CROSS-REFERENCE TO RELATED APPLICATIONS

This application claims priority to French Patent Application No. 2306478, filed Jun. 22, 2023, the entire content of which is incorporated herein by reference in its entirety.

FIELD

The technical field of the invention is related to the analysis of a sample, for example a biological sample, by an imaging system.

The invention relates to an imaging element for analysis of a sample, and to an associated imaging device and imaging system. The invention further relates to a method for analysing the sample using the imaging device and a method for manufacturing the imaging device.

The invention finds applications in the fields of biology and health, in particular in the field of "organs-on-chip".

BACKGROUND

Organs-on-chip are miniaturised cell culture platforms making it possible to reproduce function and structure of human organs on a micrometric scale and as close as possible to how they function in the human body.

Organs-on-chip have the advantage of being perfectly suited to the integration of sensors, as they are manufactured with similar manufacturing technologies.

These sensors are essential for accessing information relating to cells, their interactions, their proliferation or even their response to various stimuli, for example chemical (or medicinal) stimuli, and thus for understanding how organs function and for testing the effect of drugs.

Organs-on-chip applied to cellular models mimicking the central nervous system thus offer the possibility of better understanding how the brain functions as well as some neurodegenerative brain diseases, such as Parkinson's disease or Alzheimer's disease, which are related to functional aberrations of neuronal networks. These organs-on-chip also enable the effect of targeted treatments on these diseases to be tested in vitro.

For this type of organ-on-chip, electrophysiological sensors have been developed to image the extracellular electrical activity of neurons in real time.

This extracellular activity is triggered by a time change in the intracellular voltage of a neuron, called an action potential, and is associated with ionic currents across the cell membrane. Typically, an action potential lasts between 1 and 2 milliseconds and, during this time, the potential of the inner membrane shifts from −70 mV to +30 mV and then back to −70 mV.

A known type of electrophysiological sensor enabling imaging to be associated on the scale of a neuron (micrometric scale) and on the scale of a neural network (macroscopic scale) uses an array of transistors in a configuration known as EOS ("Electrolyte Oxide Silicon").

In this configuration, neurons are in an electrolyte bath which is raised, via an electrode, to a reference potential. Furthermore, the transistors do not include a metal gate electrode.

Document "Electrical imaging of neuronal activity by multi-transistor-array (MTA) recording at 7.8 µm resolution" by Lambacher et al, Applied Physics A., 2004, thus describes an MTA (Multi-Transistor Array) array of 16,384 field-effect transistors manufactured using CMOS (Complementary Metal Oxide Silicon) technology and covered with a thin insulating layer of titanium dioxide ($TiO_2$). The spatial resolution is 7.8 µm, and the surface area of the sensor is 1 $mm^2$.

The recording principle is as follows: when a neuronal cell adhering to the $TiO_2$ layer opposite a transistor emits an action potential, it produces an extracellular potential at the junction between the cell and the $TiO_2$ layer which differs from the reference potential of the electrolyte bath. This local change in the electric field is capacitively coupled, through the insulating $TiO_2$ layer, to the transistor gate and gives rise to a modulation of the source-drain current calibrated as a function of the field potential.

Document "Signal Transmission from individual mammalian nerve cell to field-effect transistor" by Voelker et al, Small Journal, 2, 206-210, 2005 describes an improved EOS transistor network in that it allows extracellular electrical activity to be recorded with a better signal-to-noise ratio. The transistors do not include a $TiO_2$ layer, and the neurons are disposed directly on the gate oxide of the transistors.

However, this recording is very sensitive to the position of the neuronal cells on the transistors. It is not enough for a neuronal cell to be positioned opposite a transistor for it to generate a signal therein.

Indeed, only a small part of the transistor defined by the gate electrode is actually a sensitive zone. This part is limited by the length of the gate. A non-negligible surface of the sensor therefore does not contribute to detection of electrical activity.

There therefore remains a need for an imaging system that is less sensitive to the position of neuronal cells, thus allowing more robust contact (or connection) of these neuronal cells to it.

This need exists more widely for the study of samples comprising at least one source able to generate an electrical signal.

SUMMARY

In the field of sensors, "receiver" refers to the element which is in contact with the sample and provides a signal in response to an event generated by the sample, and "transducer" refers to the element which receives a signal in one form and transforms it into a signal in another form.

The inventors have identified that an obstacle to addressing the problem previously discussed is related to the fact that, in the sensor of the state of the art, the receiver and the transducer are integrated into each other. This means that the surface area of the sensitive zone cannot be increased in order to reduce positioning sensitivity and improve contact robustness without modifying the architecture of the transistor itself.

The invention offers a solution to the problem previously discussed by making it possible to make an imaging element in which the receiver and the transducer are two distinct elements electrically connected, so that it is possible to obtain easily, that is, independently of the transducer, a sensitive surface area of greater size than the surface area of the CMOS transistor of the state of the art.

A first aspect of the invention relates to an imaging element for analysis of a sample and comprising:

an electrode adapted to receive the sample, a light-emitting element, disposed opposite the electrode, and separated from the electrode by an insulating protective layer, a voltage-controlled current source configured to supply current to the light-emitting element and comprising a control electrode electrically connected to the electrode, so that said light-emitting element generates a light wave in response to a voltage coming from the sample.

The light-emitting element may here be understood as an element which produces monochromatic or polychromatic radiation, for example in the 400-800 nm spectral band, by conversion of electrical energy when an electric current passes through it. Light-emitting diodes or LEDs (Light-emitting Diode) and their derivatives, mainly organic light-emitting diodes or OLEDs (Organic Light-emitting Diode) are examples of light-emitting elements.

Thus, the imaging principle is as follows:

a sample is disposed on the electrode, a variation in the electrical potential of the sample modifies electrical potential of the electrode.

This electrical potential is used to control the current source, which responsively provides a current through the light-emitting element. This current then generates, in the light-emitting element, a light wave whose amplitude is indicative of the action potential of the neuronal cell.

Thus, the imaging element according to the first aspect of the invention includes a receiver (the electrode) and a transducer (the light-emitting element) which are two distinct elements because they are separated by the protective layer, located opposite each other, and connected by an electrical connection (via the current source).

This configuration of the imaging element provides freedom of arrangement of the electrode with respect to the light-emitting element, and makes it possible to adapt the surface area of the receiver, and in any case to increase it with respect to the surface area of a CMOS transistor of an MTA array, without modifying the transducer (here the light-emitting element).

The device according to the first aspect of the invention may also have one or more of the following characteristics, considered individually or according to any technically possible combinations.

The light-emitting element is disposed between the protective layer and a transparent, semi-transparent support substrate.

The electrode and the protective layer are transparent or semi-transparent.

The term "transparent" means having an optical transmission coefficient greater than 60% for at least one wavelength in the 400-800 nm spectral band.

The term "semi-transparent" means having an optical transmission coefficient greater than 60% for at least one wavelength in the 400-800 nm spectral band.

Thus, the light wave propagates through the transparent or semi-transparent electrode, opposite which it can be viewed and/or measured, for example by an optical photodetector.

The current source comprises a transistor having:

a gate electrode constituting the control electrode of the current source;

a source electrode connected to the light-emitting element; and a drain electrode connected to a power supply terminal.

The transistor is beneficially a simple technology for converting a potential difference into a current.

When the current source comprises a transistor, the transistor is a thin-film transistor, also known as a TFT.

Thin-film transistors have several benefits, among which good compatibility with microelectronic manufacturing processes, low cost and high flexibility, enabling them to drive different types of light-emitting elements.

The lateral dimensions of the electrode are greater than the lateral dimensions of the transistor.

Thus, the sensitive surface area is increased compared with the state of the art, which allows improved detection efficiency (fewer events are "missed" and the response provided by the imaging element more accurately reflects reality).

The lateral dimensions of the electrode are, in an embodiment, between 4 µm and 20 µm, and for example equal to 15 µm.

Thus, the size of the sensitive surface area corresponds to the size of a neuronal cell. The imaging element is then well adapted, in size, to detect and monitor the extracellular electrical activity of an individual neuronal cell.

The light-emitting element may be an organic light-emitting diode.

Organic light-emitting diodes have a relatively simple structure based on a superposition of several organic semiconducting layers between two electrodes, at least one of which is transparent or semi-transparent. The manufacturing method is beneficial in terms of cost and complexity, since the semiconducting layers and the electrode can be deposited onto a full plate (that is, onto the entire surface area of the substrate), which avoids lithography and etching steps.

Organic light-emitting diodes also have the benefit of being available in micrometric lateral dimensions (for example 10 µm and less), of being flexible and easily connectable to an electronic driver circuit, for example an electronic circuit in CMOS technology. Finally, they require a lower current than inorganic light-emitting diodes.

The light-emitting element may be an inorganic light-emitting diode, such as, in an embodiment, an inorganic micro light-emitting diode.

Like OLEDs, Micro Light-Emitting Diodes or microLEDs have the benefit of having micrometric dimensions well adapted to the size of neuronal cells, for example dimensions of between 15 µm and 20 µm.

Compared with OLEDs, microLEDs have a higher luminance and a longer lifetime, but they require a higher control current and are more difficult to manufacture.

The imaging element further comprises an electronic driver circuit configured to generate a control voltage of the current source, said electronic driver circuit electrically connecting the control electrode of the current source and the electrode.

By "electronic driver circuit", it is meant a circuit which produces a control voltage adapted to control, via the current supplied by the current source, some emission characteristics of the light-emitting element. These characteristics are, for example, the light intensity dynamics, the emission duration (related to the observation time), etc.

A second aspect of the invention relates to an imaging device comprising a plurality of imaging elements according to the first aspect of the invention.

The imaging elements are, in an embodiment, arranged so as to have a first pitch in a first direction and a second pitch in a second direction intersecting the first direction.

The first pitch is between 4 µm and 30 µm and, in an embodiment, equal to 10 µm, and the second pitch has the same dimensional characteristics as the first pitch.

Thus, the pitch is equal to or less than the size of a neuronal cell.

The imaging device then includes a regular array, or matrix, of imaging elements.

Thus, the device associates imaging capability at several scales: the scale of an imaging element, and the scale of the array.

The imaging elements are, in an embodiment, distributed over a surface area greater than 1 cm$^2$, for example 4 cm$^2$.

Thus, when the imaging elements are dimensioned to correspond to the size of a neuronal cell, the device has imaging capabilities associating micrometric spatial resolution (for example, 15 µm) and a centimetric field of analysis (for example, 4 cm$^2$).

Such capabilities make it possible to simultaneously image the activity of a large number of neuronal cells and to study the correlation between this activity and the function of neuronal networks. Furthermore, it is possible to multiplex experimental conditions on the same sample. This avoids the introduction of inter-sample variations that could bias the measurements. Several drugs can thus be tested and their effects reliably compared, with a view to better predicting the effectiveness of future treatments for diseases.

A third aspect of the invention relates to a system for imaging a sample comprising:
  an imaging device according to the second aspect of the invention,
  an image sensor disposed opposite said imaging device, and adapted to form at least one image of the light wave generated by the imaging device under the effect of the sample,
  a processor adapted to process the image formed by the photodetector.

By virtue of electro-optical transduction, viewing, recording and analysis of the electrical activity are carried out by an optical system (image sensor and processor) located remotely from the imaging device and the sample.

This optical system can also be used to image morphological details as well as movements of this sample.

The association of these two imaging modes (electrical and morphological) makes it possible to correlate the electrical activity of a population of neuronal cells with morphological and organisational changes or cell movements.

A fourth aspect of the invention relates to a method for analysing a sample using the imaging device according to the second aspect of the invention, comprising the following steps of:
  Depositing the sample onto the imaging device so that the sample is in contact with at least one of the electrodes of said imaging device, each electrode in contact belonging to a corresponding imaging element of said imaging device,
  Optically detecting electrical activity of the sample, comprising a step of collecting a light wave generated by the light-emitting element of the imaging element corresponding to the electrode in contact, the light wave being generated in response to a voltage coming from the sample.

The light wave generated can be collected by an image sensor, disposed opposite the imaging device, and wherein the collection step is followed by a step of acquiring, by the photodetector, an image representative of the light wave.

The step of acquiring the image representative of the light wave may be followed by a step of determining the voltage coming from the sample from the image acquired by the image sensor.

A fifth aspect of the invention relates to a method for manufacturing an imaging element for analysis of a sample, comprising the following steps of:
  Providing an electronic circuit comprising a bonding pad and a voltage-controlled current source, the current source comprising a control electrode electrically connected to the bonding pad,
  Forming a light-emitting element on the electronic circuit,
  Forming a transparent or semi-transparent and insulating protective layer covering the light-emitting element and the bonding pad,
  Forming, on the protective layer and opposite the light-emitting element, a transparent or semi-transparent electrode adapted to receive the sample,
  Forming, through the protective layer, a conductive via extending from the transparent or semi-transparent electrode to the bonding pad.

In an embodiment of this manufacturing method, the conductive via and transparent or semi-transparent electrode are formed from a same material, which is conductive and transparent or conductive and semi-transparent respectively.

The manufacturing method can then comprise, to form the transparent electrode and the conductive via, the following sub-steps of:
  Forming, by etching the protective layer, an aperture extending from the surface of the protective layer to the bonding pad connected to the control electrode of the current source,
  Simultaneously forming the transparent or semi-transparent electrode and the conductive via by depositing, in a single step, the conductive and transparent or semi-transparent material onto the surface of the protective layer, opposite the light-emitting element, and onto the walls of the aperture.

The invention and its different applications will be better understood upon reading the following description and upon examining the accompanying figures.

BRIEF DESCRIPTION OF THE FIGURES

The figures are set forth by way of indicating and in no way limiting purposes of the invention.

Unless otherwise specified, a same element appearing in different figures has a unique reference.

DETAILED DESCRIPTION

As mentioned above, the present invention especially relates to an imaging device comprising a plurality of imaging elements for detecting and viewing the electrical activity of a sample.

In the remainder of the description, the sample will be considered to be a biological sample such as neuronal cells cultured in a culture medium.

Figure 1:
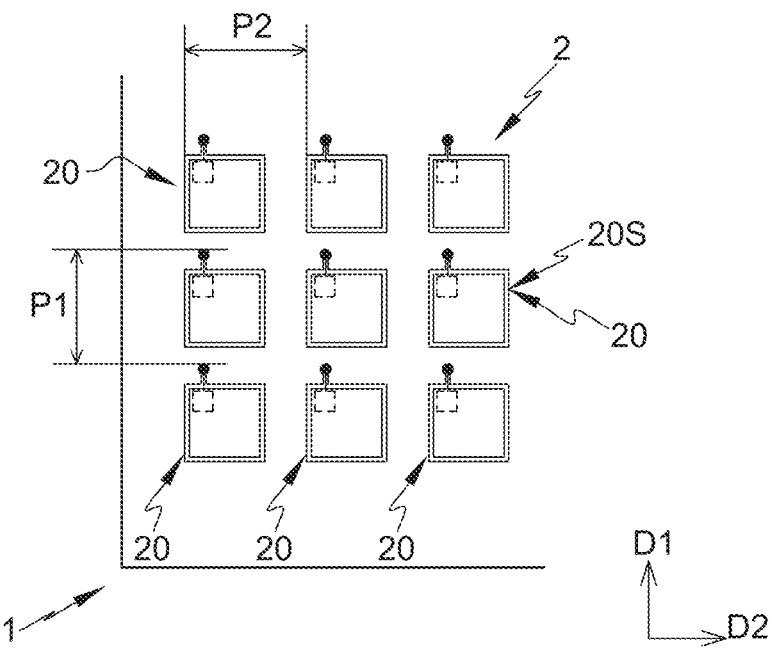
FIG. 1 schematically represents, in a top view, an embodiment of an imaging device, in the form of an array of imaging elements, FIG. 2 schematically represents, in a transverse cross-section view, the imaging array of FIG. 1 and illustrates its operating principle, FIG. 3 schematically represents, in a top view, an imaging element of the imaging array of FIG. 1, FIG. 4 schematically represents, in a transverse cross-section view along a section plane AA, the imaging element of FIG. 3, FIG. 5 schematically represents, in a transverse cross-section view along a section plane BB, the imaging element of FIG. 3.
Figure 2:
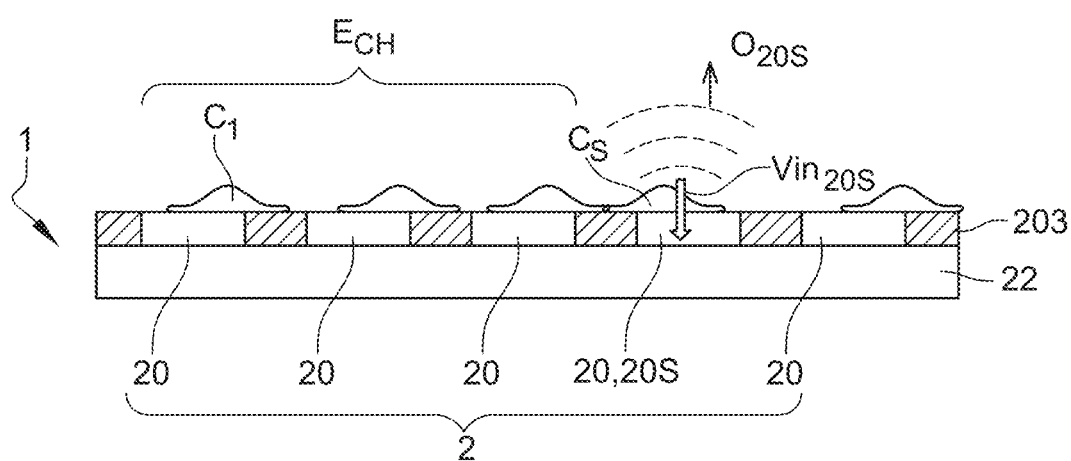

An embodiment of this imaging device is represented in FIGS. 1 and 2, in a top view and a cross-section view respectively.

The imaging device 1 comprises m×n imaging elements 20. m and n are non-zero positive natural numbers. By way of example, m and n may be equal to 2000.

The imaging elements 20 are of the same type, that is, manufactured together and in the same way, and therefore have the same characteristics or very similar characteristics. They are identical in an embodiment.

The imaging elements 20 are arranged in rows and columns in the form of an array 2. Beneficially, they have a first pitch P1 in a first direction D1 and a second pitch P2 in a second direction D2 intersecting the first direction. The second direction D2 is for example perpendicular to the first direction D1.

The pitches P1, P2 may be identical. The imaging device then includes a regular array, or matrix, of imaging elements.

In an embodiment, the pitches P1, P2 are between 4 µm and 30 µm.

In an embodiment, the pitches P1 and P2 are between 4 µm and 10 µm. Thus, the pitches P1, P2 are equal to or smaller than the size of a neuronal cell.

The general operating principle of the imaging device 1 is described in relation to FIG. 2.

The device 1 is intended to receive the sample $E_{CH}$.

When one of the neuronal cells CS in this sample $E_{CH}$ emits an action potential, it produces an extracellular potential $Vin_{20S}$ on the surface of the imaging element 20S with which it is in contact which, in response, locally produces, on the surface of the device 1, a light wave $O_{20S}$ having at least one wavelength, for example in the 400 nm-800 nm spectral band, and whose intensity depends on the amplitude of the extracellular potential $Vin_{20S}$.

Assuming that the other cells $C_1$ in the sample $E_{CH}$ do not produce any action potential (that is, are inactive), the other imaging elements 20 are inactive or "switched off".

Since the light wave $O_{20S}$ is located at the electrically active cell, and the intensity of this light wave varies as a function of the extracellular potential $Vin_{20S}$, it is possible to acquire a quantitative map of the electrical activity of the sample $E_{CH}$.

The imaging elements 20 are thus comparable to pixels on a screen, with the difference that the signal $O_{20S}$ they deliver is driven by, or a function of, the electrical activity $Vin_{20S}$ of the sample $E_{CH}$.

The operation of the imaging device 1 will be better understood using the description of the imaging element 20 hereafter.

FIGS. 3 to 6 schematically represent, in different views, a first embodiment of the imaging element 20.

Figure 8:
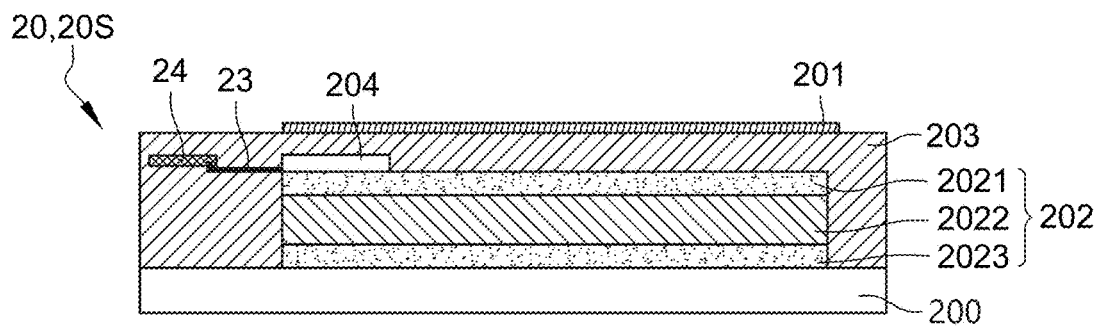
Figure 9:
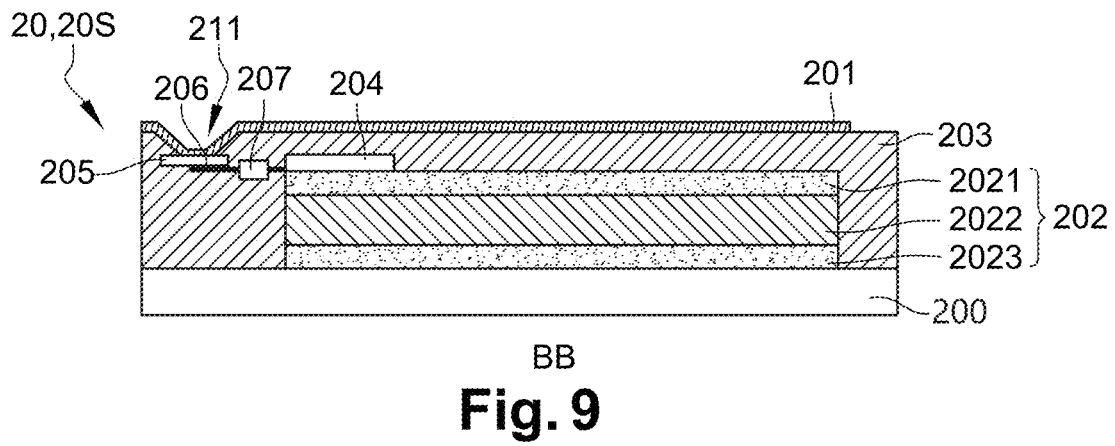

FIGS. 8 and 9 schematically represent, in cross-section views, a second embodiment of the imaging element 20.

Figure 6:
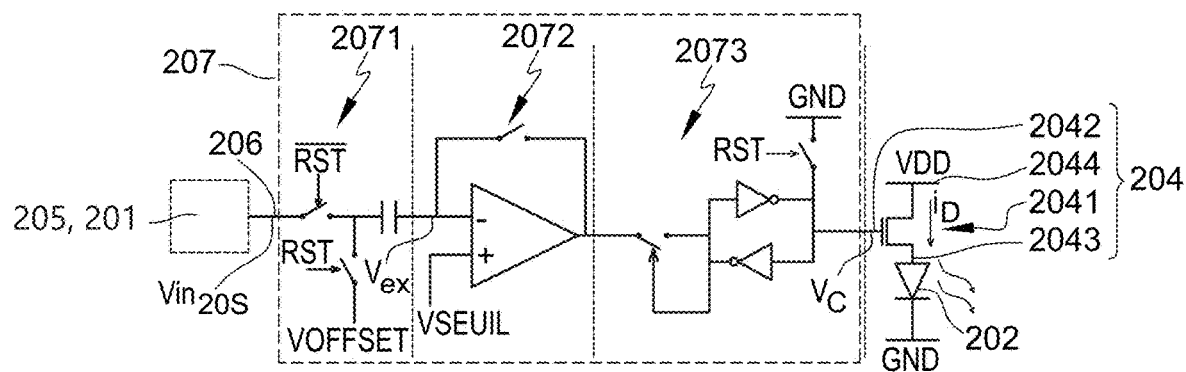
FIG. 6 is an example of a simplified electrical diagram of the imaging element of FIG. 3, FIG. 7 schematically represents, in a transverse cross-section view along a section plane BB, an alternative embodiment of the imaging element of FIG. 3, FIG. 8 schematically represents, in a transverse cross-section view along a section plane AA, an alternative imaging element to the imaging element of FIG. 3, FIG. 9 schematically represents, in a transverse cross-section view along a plane section BB, the imaging element of FIG. 8, FIG. 10 schematically represents an imaging system based on the imaging device of FIG. 1.

Reference is first made to FIGS. 6 and 9, which represent the first and second embodiments of the imaging element 20 in the same cross-section view BB.

Common to these two embodiments, the imaging element 20 is for analysis of the sample $E_{CH}$ and comprises:
- an electrode 201 adapted to receive the sample $E_{CH}$
- a light-emitting element 202, disposed opposite the electrode 201, and separated from the electrode by an insulating protective layer 203. By "opposite", it is meant that all or part of the light-emitting element 202 is opposite, or faces, the electrode 201.
- a voltage-controlled current source 204 configured to supply current to the light-emitting element 202 and comprising a control electrode (not represented in FIGS. 6 and 9) electrically connected to the electrode 201.

The electrode 201 is used as a sensitive surface, or receiver, that is, it is in contact with the sample $E_{CH}$, more precisely with a cell Cs of this sample $E_{CH}$, and collects the extracellular potential Vinos emitted by this cell Cs in contact.

The term "adapted to receive the sample $E_{CH}$" means that the electrode is not likely to degrade this sample $E_{CH}$ when it is in contact with it. Since the sample $E_{CH}$ under consideration is biological, the electrode 201 is biocompatible.

The electrode 201 has lateral dimensions, in an embodiment, between 4 µm and 20 µm, and for example equal to 10 µm.

These ranges of dimensions are particularly well adapted to the size of neuronal cells, which is generally between 10 µm or 15 µm. More precisely, these dimensions are small enough to allow analysis of an individual neuronal cell, and large enough for the connection to that individual cell to be robust with respect to the position of that cell. The sensitive surface area thus obtained is indeed especially larger than that previously described in the state of the art, which makes it possible to improve the ability to detect an action potential (or, in other words, the risk of missing an electrical event is reduced).

Besides, as the entire surface of the electrode 201 is conductive, the position of the neuronal cell on the electrode 201 is of little importance. In other words, there is no need for the sample to be positioned precisely on a certain part of the imaging element for an action potential to be detected.

The imaging element is thus well adapted to the electrical imaging of an individual neuronal cell, while being, compared to the state of the art, less sensitive to the position of the sample, thereby increasing the detection efficiency and providing a more faithful (more consistent) response to the actual electrical activity of the sample.

The light-emitting element 202 is used as an electro-optical transducer, making it possible to produce, as previously described in relation to FIG. 2, the light wave $O_{20S}$ in response to the extracellular potential $Vin_{20S}$ generated by the sample $E_{CH}$ and collected by the electrode 201.

The light-emitting element 202 refers to an element which produces monochromatic or polychromatic non-coherent radiation in the 400-800 nm spectral band, that is, in the transparency spectral band, by conversion of electrical energy when an electric current passes through it.

The intensity of this radiation is beneficially proportional to the electric current.

In an embodiment, the light-emitting element 202 is an organic light-emitting diode or OLED. This technology enables easier and less costly manufacture and integration, and enables the device to be driven with lower control currents than an LED (Light-emitting Diode), for example.

Figure 4:
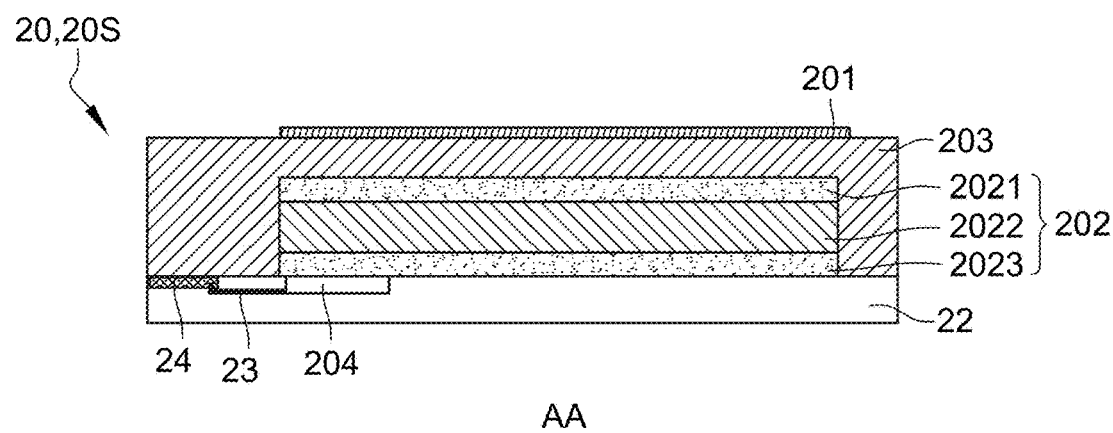
Figure 5:
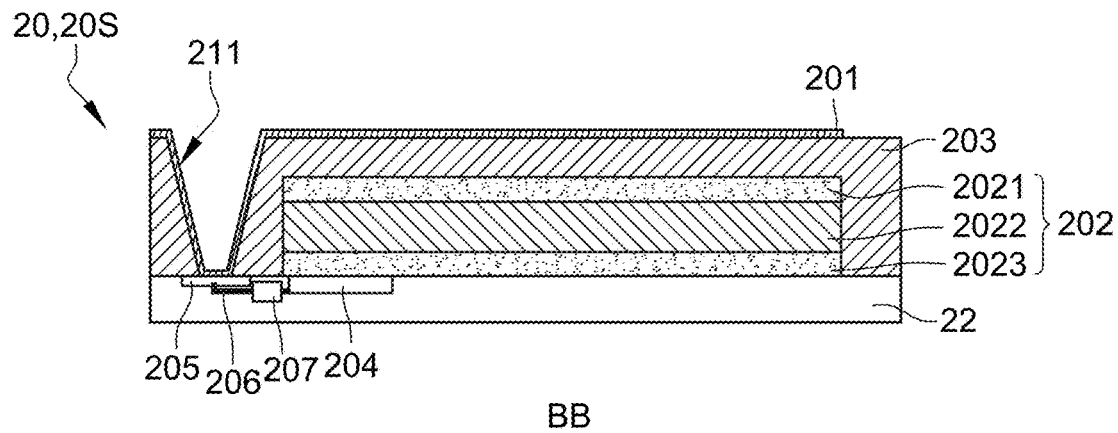

The inner structure of the light-emitting element 202 is represented in particular in FIG. 4 and FIG. 5 (for the first embodiment), and in FIGS. 8 and 9 (for the second embodiment).

With reference to these FIGS. 4, 5, 8 and 9, the light-emitting element 202 comprises an organic layer 2022 disposed between two electrodes, the anode 2023 and the cathode 2021 being transparent or semi-transparent.

The light-emitting element 202 has lateral dimensions which are in an embodiment close to the lateral dimensions of the transparent electrode 201. Thus, these dimensions are in an embodiment between 10 µm and 15 µm, for example 12 µm.

Such dimensions make it possible to obtain good spatial correspondence between the transparent electrode 201 (the receiver) and the light-emitting element 202 (the transducer).

For this, with reference to FIGS. 4 and 5, or 8 and 9, the cathode 2021, the organic layer 2022 and the anode 2023 of the light-emitting element 202 are patterned to have the desired lateral dimensions.

The organic layer 2022 may be formed of several layers, for example a HTL (Hole Transporting Layer) layer and an emissive layer.

Figure 7:
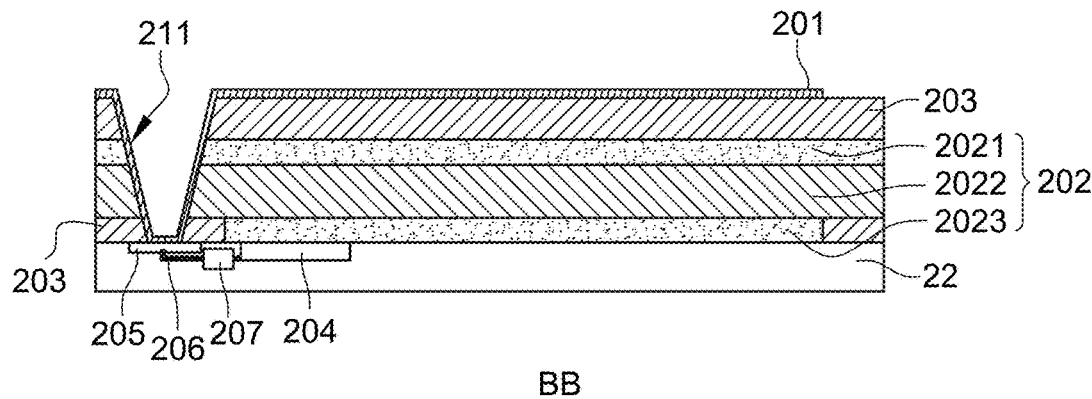

According to an alternative embodiment represented by FIG. 7, compatible with both embodiments, only the anode 2023 of the light-emitting element 202 is patterned to have these dimensions. From a manufacturing point of view, this arrangement simplifies the method since the organic layer 2022 and the cathode 2021 can be formed by deposition in a single step, that is, without a lithography and etching step.

The light-emitting element 202 may also be an inorganic light-emitting diode (LED), in particular a microLED.

Like OLEDs, microLEDs have the benefit of having micrometric dimensions well adapted to the size of neuronal cells, for example dimensions of between 15 µm and 20 µm.

Compared to OLEDs, microLEDs have a higher luminance and a longer lifetime, but they require a higher control current and are more difficult to manufacture.

The protective layer 203 is an encapsulation layer, which makes it possible to protect the light-emitting element 202, and thus to guarantee its lifetime. It further enables the electrode 201 to be electrically insulated from the light-emitting element 202.

It is noted that, due to the arrangement of the protective layer 203 in the imaging element 20, the electrode 201 is distinct from the light-emitting element 202. In particular, it is distinct from the electrodes, anode 2021 and cathode 2023, of this light-emitting element 202.

The protective layer 203 may also surround the electrode 201 when the latter does not cover the entire surface of the imaging element 20. It may also serve to separate the imaging elements 20 from one another in the imaging device 1 represented in FIG. 2. It then forms insulating blocks separating the imaging elements 20. In these two cases, the sample $E_{CH}$ can also be in contact with the protective layer 203 which is then, like the electrode 201, adapted to receive the sample $E_{CH}$.

The protective layer 203 may be formed of a stack of organic sublayers and inorganic sublayers which may be transparent.

The inorganic layers are, for example, based on aluminium oxide ($Al_2O_3$) or titanium dioxide ($TiO_2$). Organic layers are resin-based.

The thickness of the protective layer 203 is, in an embodiment, between 25 nm and 1 µm, and is for example equal to 300 nm.

The current source 204 makes it possible to drive the light-emitting element 202 in response to the electrical activity $Vin_{20S}$ of the sample $E_{CH}$.

More precisely, the current source 204 has the effect of converting the extracellular potential $Vin_{20S}$ generated by the sample $E_{CH}$ (and collected by the electrode 201) into a current passing through the light-emitting element 202 and capable of generating the light wave $O_{20S}$ in this light-emitting element 202.

With reference to FIG. 5 (first embodiment) or FIG. 9 (second embodiment), the electrical connection between the current source 204 and the transparent electrode 201 comprises an electrical track 206, a bonding pad 205, and a conductive via 211.

The electrical track 206 is metal, for example.

The bonding pad 205 is metal, for example.

The conductive via 211 extends from the transparent electrode 201 to the bonding pad 205.

In an embodiment, the conductive via 211 is formed from the same material as the transparent electrode 201. The manufacturing method is then made easier because the electrode 201 and the via 211 are formed simultaneously.

FIG. 6 is an example of a simplified electrical diagram of the imaging element 20, compatible with all embodiments of the imaging element 20.

With reference to this FIG. 6, the current source 204, in an embodiment, comprises a transistor 2041 having:
  a gate electrode 2042 constituting the control electrode of the current source 204;
  a source electrode 2043 connected to the light-emitting element 202; and
  a drain electrode 2044 connected to a power supply terminal.

With reference to FIG. 4 (first embodiment) and 8 (second embodiment), this power supply terminal may be coupled, via metal electrical tracks 23, 24 to a voltage source (not represented in FIG. 5).

In an embodiment, the transistor 2041 is a thin-film transistor, also known as a TFT.

With reference to FIG. 6, the transistor 2041 supplies a current $i_D$ between the drain and source electrodes 2043, 2044 which is controlled by the voltage $V_{DD}$ applied to the supply terminal (and therefore to the drain electrode 2044) and by the electrical voltage Vc of the gate electrode 2042. In FIG. 6, the references VSEUIL, VOFFSET, RST and RST correspond to control voltages.

The transistor 2041 operates in saturated mode.

In the absence of electrical activity in the neuronal cell Cs, the transistor 2041 is off. No current Ip circulates between the drain 2042 and source 2043 electrodes, or through the light-emitting element 202. The light-emitting element 202 is therefore switched off and forms a "black" pixel.

When there is electrical activity of the neuronal cell $C_{20S}$, the extracellular potential Vinos modifies the voltage Vc of the gate electrode, which is then sufficient to switch on the transistor 2041. A current $i_D$, proportional to the gate voltage Vc, then passes through the light-emitting element 202, which emits the light wave $O_{20S}$ with an intensity proportional to the gate voltage Vc.

In a calibration phase, the electrical potential on the transparent electrode 201 is modulated around an operating point and the variations in intensity of the light wave $O_{20S}$ are measured. Calibration data associated with the imaging element 20, 20S are thus obtained.

In an analysis phase, the light intensity is measured and related, via the calibration data, to the amplitude of the extracellular potential $Vin_{20S}$.

With reference to FIG. 6, the imaging element 20, in an embodiment, comprises an electronic driver circuit 207 electrically connected, on the one hand, to the control electrode 2042 of the current source 204 and, on the other hand, via the bonding pad 205, to the transparent electrode 201.

The driver circuit 207 is configured to generate, from the extracellular potential $Vin_{20S}$, an electrical control voltage Vc on the control electrode 2042 of the current source 204.

For this, the driver circuit 207 may comprise one or more functional blocks called stages, arranged in series.

For example, it comprises a switch stage 2071 for triggering reading of the transparent electrode 201, and in so doing, to provide an extracellular voltage $V_{ex}$ from the extracellular potential $Vin_{20S}$ and a reference voltage $V_{offset}$.

It may also comprise an amplification stage 2072 which makes it possible to amplify the extracellular voltage $V_{ex}$ so that the control voltage is greater than the threshold voltage of the transistor 2041, this threshold voltage being defined as the voltage between the gate electrode 2042 and the source electrode 2043 for which the inversion zone appears.

Thus, even extracellular potentials of low amplitude, for example 15 mV, are detected and lead to the emission of the light wave $O_{20S}$ by the light-emitting element 20.

It may also comprise a memory stage 2073 which makes it possible to ensure maintaining of the electrical voltage Vc on the control electrode 2042 of the current source 204 over a certain period of time. This duration is, at most, the same as the neuronal activity time, that is, from 1 ms to 2 ms. In an embodiment, this duration is adapted to guarantee an observation time (of the light wave) sufficient to be measurable, for example this duration is between 10 us and 100 μs.

The stage 2071, the amplification stage 2072 and the memory stage 2073 are arranged, in sequence, in series.

The imaging element 20 just described in relation to FIGS. 3 to 9 has several benefits, especially:
- It is not necessary to dispose the sample in an electrolyte bath, or to polarise that electrolyte bath.
- The light-emitting element 202 makes it possible to produce an optical signal representative of neuronal electrical activity without the need to incorporate, in the cell, colorants (for example, proteins) sensitive to variations in cell voltage. Imaging is therefore non-invasive.

Figure 3:
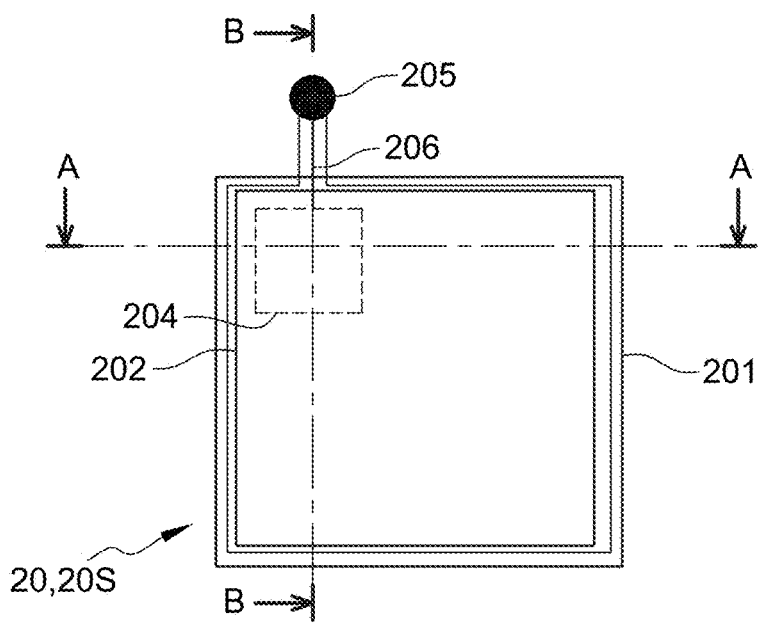

According to the first embodiment, illustrated especially in FIGS. 3, 4 and 5, the electrode 201 is transparent or semi-transparent, as is the protective layer 203.

The term "semi-transparent" refers to any material or element which has an optical transmission coefficient greater than 60% for at least one wavelength in the spectral band extending in the visible range, that is, between 400 nm and 800 nm.

The term "transparent" refers to any material or element which has an optical transmission coefficient greater than 80% for at least one wavelength in the spectral band extending in the visible range, that is, between 400 nm and 800 nm.

Thus, the light wave $O_{20S}$ generated by the light-emitting element 202 in response to the electrical activity of the sample $E_{CH}$ passes through the transparent or semi-transparent protective layer 203 and the transparent or semi-transparent electrode 201.

The light wave $O_{20S}$ is therefore generated at least partly on the same side as the sample $E_{CH}$. A benefit is that it is then relatively easy to combine, using optical systems, the image of the electrical activity with the image of the morphological details of the sample $E_{CH}$.

The association of these two imaging modes (electrical and morphological) makes it possible to correlate the electrical activity of a population of neuronal cells with morphological and organisational changes or cell movements.

The transparent or semi-transparent electrode 201 is formed from a transparent, or respectively semi-transparent, and conductive material.

In an embodiment, this material is chosen from the following materials: Poly(3,4-Ethylenedioxythiophene) (or PEDOT), Indium Tin Oxide (or ITO), Tin Dioxide ($SnO_2$), Zinc Oxide (ZnO) or Aluminium-doped Zinc Oxide (or AZO).

The transparent or semi-transparent electrode 201 may also be formed of a thin layer, of between 5 nm and 100 nm, of aluminium (Al), silver (Ag), or chromium (Cr).

The electrode 201 is transparent when it has a thickness of between 5 nm and 30 nm.

The electrode 201 is semi-transparent when it has a thickness of between 5 nm and 100 nm.

Beneficially, the anode 2023 of the light-emitting element is an optical reflection surface. Thus, the light wave $O_{20S}$ is generated essentially in the direction of the transparent or semi-transparent electrode 201. This configuration avoids optical losses, and improves the sensitivity limit of the imaging element 20.

With reference to FIG. 5, the voltage-controlled current source 204 forms part of an electronic circuit 22. This circuit 22 is, for example, coupled to the light-emitting element 202 on the anode 2023 side of this light-emitting element 202. The electronic circuit 22 further serves as a substrate, or support, for the imaging element 20, and more widely for the imaging device 1 illustrated in FIG. 1.

The electrical track 206 is, in an embodiment, integrated into the electronic circuit 22.

The bonding pad 205 is, in an embodiment, integrated into the electronic circuit 22. It is, for example, arranged so as to be flush with the surface of the circuit 22. It may also be arranged protruding (not represented in FIG. 6).

It will be noted that when the same material is used to form the electrode 201 and the conductive via 211, a transparent or semi-transparent via 211 is then available, making it possible to avoid some optical phenomena (parasitic reflections) that may disturb the propagation of the light wave $O_{20S}$.

According to the second embodiment, illustrated in FIGS. 8 and 9, the light-emitting element 202 is disposed between the protective layer 203 and a transparent or semi-transparent substrate 200.

As a result, the light wave $O_{20S}$ generated by the light-emitting element 202 in response to the electrical activity of the sample $E_{CH}$ passes through this transparent or semi-transparent substrate 200.

Being able to collect this light wave $O_{20S}$ on the side opposite to the electrode 201 frees up space above the sample $E_{CH}$, which space can be used to carry out other types of measurements on this sample.

The transparent or semi-transparent substrate 200 serves as a protection and support for the light-emitting element 202. This may be glass.

The electrode 201 and the protective layer 203 are not necessarily transparent or semi-transparent.

They may be opaque. In this case, the electrode 201 may be made of a metal, for example aluminium (Al), silver (Ag) or chromium (Cr).

Beneficially, the electrode 201 is a reflective surface. The metal used to form this electrode 201 may therefore be silver (Ag). This optimises the optical power passing through the substrate 200, and therefore improves the detection limit of the imaging element 20.

The cathode 2021 of the light-emitting element may also be a reflective surface.

With reference to FIG. 8, the connection of the current source 204 to the metal tracks 23 and 24 is similarly arranged so as not to block the passage of the light wave $O_{20S}$ through the substrate 200.

With reference to FIG. 9, the current source 204, as well as the connection elements 205, 206, 211 and the electronic circuit 207 are arranged so that they do not block the passage of the light wave $O_{20S}$ through the substrate 200. For example, they may be arranged, at least in part, between the electrode 201 and the light-emitting element 202.

Regardless of the embodiment of the imaging element 20, the arrangement in superimposed levels of the current source 204, the light-emitting element 202, the protective layer 203 and the transparent electrode 201 makes it possible to obtain a compact imaging element 20, and integrating all the reception/transduction functions.

This makes it possible to make, in the imaging device 1 represented in FIG. 1, the array 2 of imaging elements 20 with a high density, for example more than 6000 electrodes per $mm^2$, and a large surface area, for example $2 \times 2$ $cm^2$.

The imaging device 1 thus has imaging capabilities associating micrometric spatial resolution, of between 4 μm and 10 μm, and a centimetric field of analysis, for example 4 $cm^2$, greater than the state of the art.

Such capabilities make it possible to simultaneously image the activity of a large number of neuronal cells and to study the correlation between this activity and the function of neuronal networks. Furthermore, it is possible to multiplex experimental conditions on a same sample. This avoids the introduction of inter-sample variations that could bias the measurements. Several drugs can thus be tested and their effects reliably compared, with a view to better predicting the effectiveness of future treatments for diseases.

Another aspect of the invention relates to an imaging system 3, represented in FIG. 3, using the imaging device 1.

This system 3 makes it possible to acquire an image of the light wave $O_{20S}$ generated by the imaging device 1 under the effect of the sample $E_{CH}$, and then to carry out, on the basis of this image, optical detection of the electrical activity of the sample $E_{CH}$.

The imaging system 3 comprises the imaging device 1, an image sensor 4 and a processor 5.

The image sensor 4 is formed of a pixel array and thus adapted to form, and acquire, at least one image of the light wave $O_{20S}$ generated by the imaging device 1 under the effect of a sample $E_{CH}$.

The image sensor 4 is disposed with respect to the imaging device 1 so as to collect the light wave $O_{20S}$ generated by one or more of the imaging elements 20S of the imaging device 1. In other words, it is disposed on the side of the face of the device 1 through which the light wave $O_{20S}$ passes.

Figure 10:
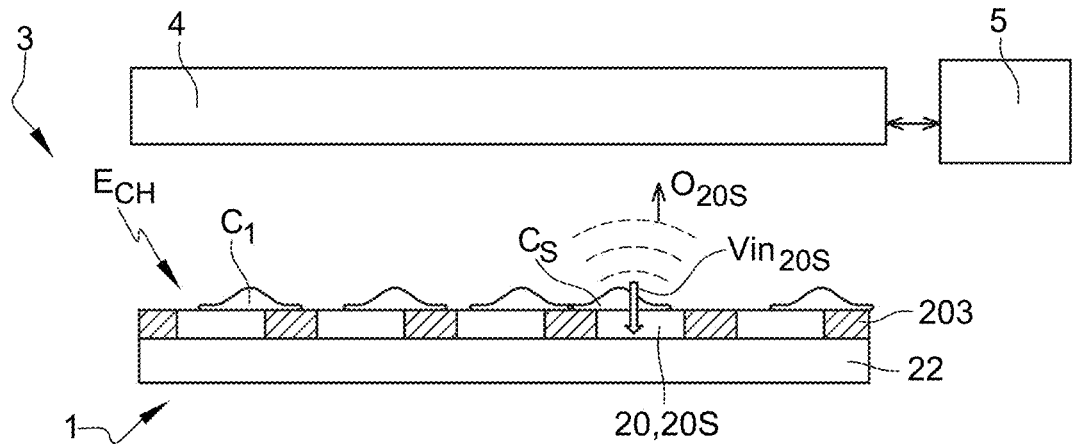

In FIG. 10, the imaging device 1 integrates the imaging elements 20 according to the first embodiment (in which the electrode 201 and the protective layer 203 are transparent or semi-transparent). Thus, the photodetector 4 is disposed on the side of the electrodes 201 of these imaging elements 20, and thus on the side of the sample $E_{CH}$. Naturally, when the imaging elements are made according to the second embodiment, the photodetector 4 is disposed on the side opposite to the electrodes 201 and the sample $E_{CH}$.

This image sensor 4 can be coupled with the face of the imaging device through which the light wave $O_{20S}$ passes by focusing optics, such as optical lenses, objectives, etc.

The image sensor 4 may be integrated into a microscope.

The processor 5 communicates with the image sensor 4. It is for example a microprocessor. It makes it possible to process the image formed by the image sensor, that is, to perform operations for determining characteristics of the image, etc.

Another aspect of the invention relates to a method for analysing the sample $E_{CH}$ using the imaging device 1.

Figure 11:
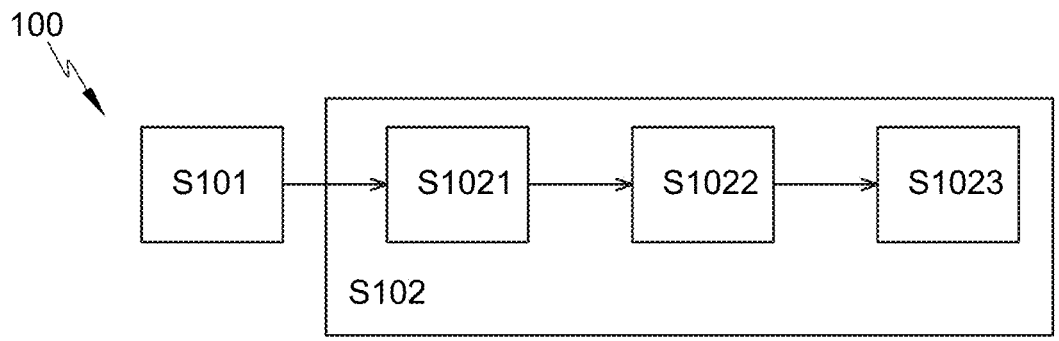
FIG. 11 is a block diagram illustrating the sequence of the main steps in a method for analysing a sample, FIG. 12A to 12L schematically represent, in cross-section views along the section plane BB, the steps or sub-steps of manufacturing the imaging element of FIG. 3.

This analysis method 100 is described in relation to FIG. 11 and comprises the main steps S101, S102 and S103.

The analysis method 100 begins with step S101 consisting in depositing the sample $E_{CH}$ onto the imaging device 1, in contact with at least one of the electrodes 201 of this imaging device 1. Each electrode 201 in contact with the sample belongs to a corresponding imaging element 20 of said imaging device 1, and is associated with the light-emitting element of said imaging element 20.

The analysis method 100 continues with step S102, which consists in performing optical detection of the electrical activity of the sample $E_{CH}$.

This optical detection comprises a step S1021 of collecting a light wave $O_{20S}$ generated by the light-emitting element (202) of the imaging element corresponding to the electrode in contact, this light wave $O_{20S}$ being formed in response to a voltage $Vin_{20S}$ coming from the sample $E_{CH}$.

Optical detection may be carried out using the image sensor 4 of the imaging system 3 (see FIG. 10).

In this case, the collection S1021 of the light wave $O_{20S}$ is carried out by the image sensor 4. The collection step S1021 can then be followed by a step S1022, by the image sensor 4, of acquiring an image representative of the light wave $O_{20S}$ formed on the image sensor 4.

This acquisition step S1022 may then continue with a step S1023 of determining the electrical activity of the sample, precisely the voltage $Vin_{20S}$ coming from the sample $E_{CH}$ from the image acquired by the image sensor 4.

This determination step S1023 is carried out by the processor 5 of the imaging system 3 (see FIG. 10). It may comprise:

a step of determining the characteristics of the image acquired, such as determining a region of interest corresponding to the active (that is, luminous) imaging elements, and determining a mean intensity value (of grey levels) on this region of interest, and a step of correlating said characteristics determined with the extracellular potential generated by the sample $E_{CH}$, using calibration characteristics. These calibration characteristics are established by implementing the optical detection step S102, using a "standard" sample consisting in applying a known electrical potential modulated about an operating point to the transparent electrode 201.

Another aspect of the invention relates to a method for manufacturing the imaging element 20.

FIGS. 12A to 12L illustrate the steps and sub-steps of this method 900 for manufacturing the imaging element 20 according to the first embodiment (illustrated in FIGS. 3, 4 and 5). It will be considered that this first embodiment comprises the fact that the protective layer 203 and the electrode 201 are transparent.

Generally, the method 900 comprises the following steps of:
Providing the electronic circuit 22 comprising the bonding pad 205 and the voltage-controlled current source 204, the current source 204 comprising a control electrode (not represented) electrically connected to the bonding pad 205,
Forming, on the electronic circuit 22, the light-emitting element 203,
Forming the transparent and insulating protective layer 203 covering the light-emitting element 202 and the bonding pad 205,
Forming, on the protective layer 203 and opposite the light-emitting element 202, the transparent electrode 201 adapted to receive the sample,
Forming, through the protective layer 203, the conductive via 211 extending from the transparent electrode 201 to the bonding pad 205 connected to the control electrode of the current source 204.

In a particular embodiment, the method 900 comprises the steps S901, S902, S903, S904, S905, S906, S907, S908, S909, S910, S911 and S912 illustrated respectively in FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L.

In this particular embodiment, the transparent electrode 201 and recontacting on the electronic circuit through the via 211 are simultaneously formed by depositing a same transparent and conductive material.

Figure 12A:
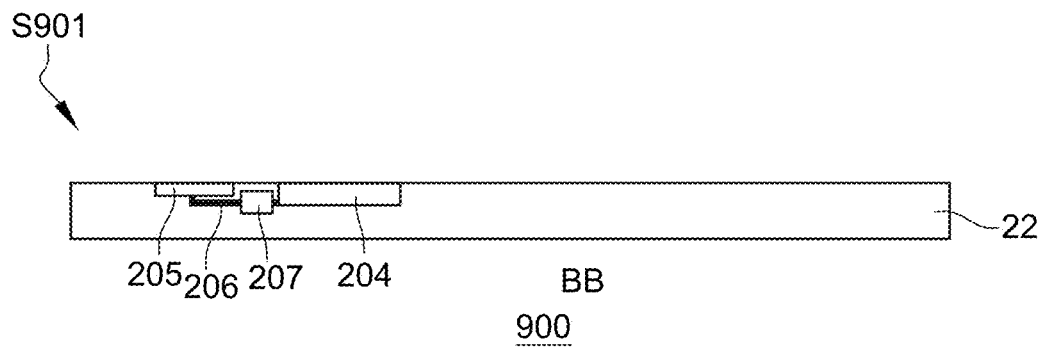

With reference to FIG. 12A, the method 300 begins with step S901, which consists in providing the electronic circuit 22.

This circuit 22 comprises the bonding pad 205 and the voltage-controlled current source 204. The current source 204 comprises the control electrode 2042 (not represented in FIG. 12A) electrically connected to the bonding pad 205 via the electrical track 206. The circuit 22 further comprises the electronic driver circuit 207.

Figure 12B:
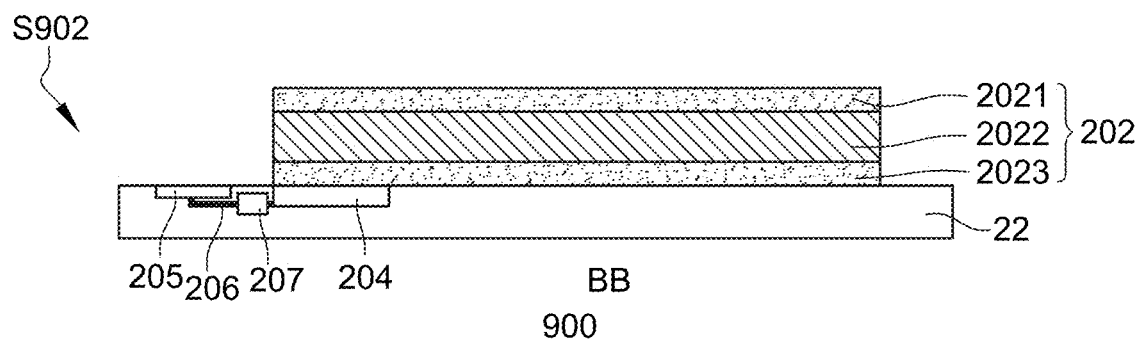

Step S902, illustrated in FIG. 12B, is accomplished after step S901 and consists in forming, on the electronic circuit 22, the light-emitting element 202.

In the case of an OLED-type light-emitting element, this step S902 comprises the following successive sub-steps of:
Forming the anode 2023 of the light-emitting element 202,
Forming the organic layer 2022,
Forming the cathode 2023.

These sub-steps are carried out by a succession of deposition, photolithography and etching steps.

Figure 12C:
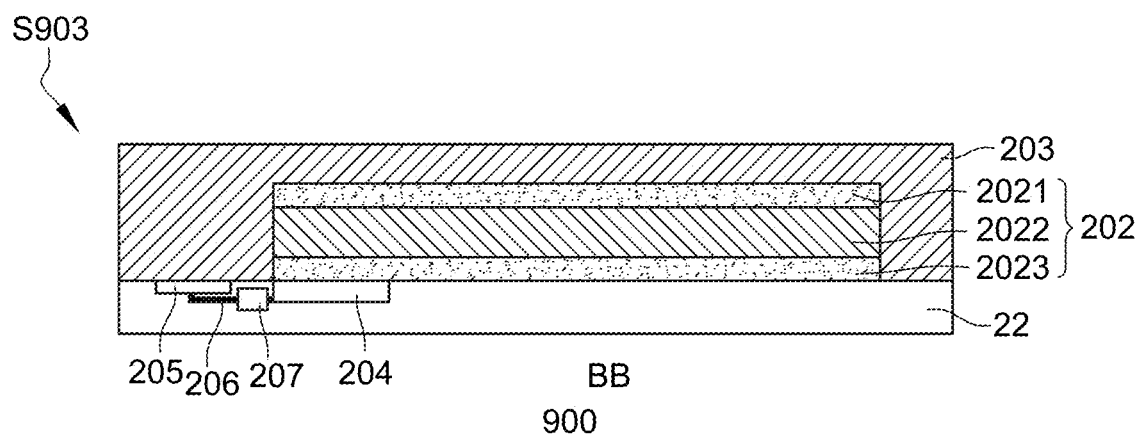

Step S903, illustrated in FIG. 12C, follows step S902 and consists in encapsulating the light-emitting element 202 with the transparent protective layer 203 (or encapsulation layer). This protective layer 203 covers the light-emitting element 202 and the bonding pad 205.

Steps S904, S905, S906 and S907 which follow step S903 aim at preparing the formation of the conductive via 211 by forming an aperture 210 at a zone adjacent to the zone 2024 (see FIG. 12F) of the light-emitting element, this aperture 210 extending from the surface 2031 of the protective layer 203 to the bonding pad 205.

Figure 12D:
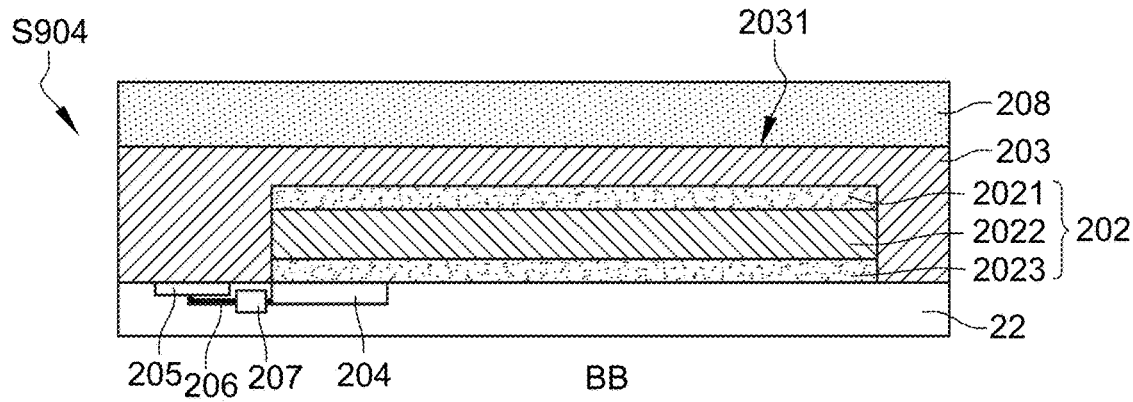

Step S904, illustrated in FIG. 12D, is a step of depositing a first sacrificial layer 208 onto the surface 2031 of the protective layer 203. The sacrificial layer 208 is, in an embodiment, a photosensitive resin layer.

Figure 12E:
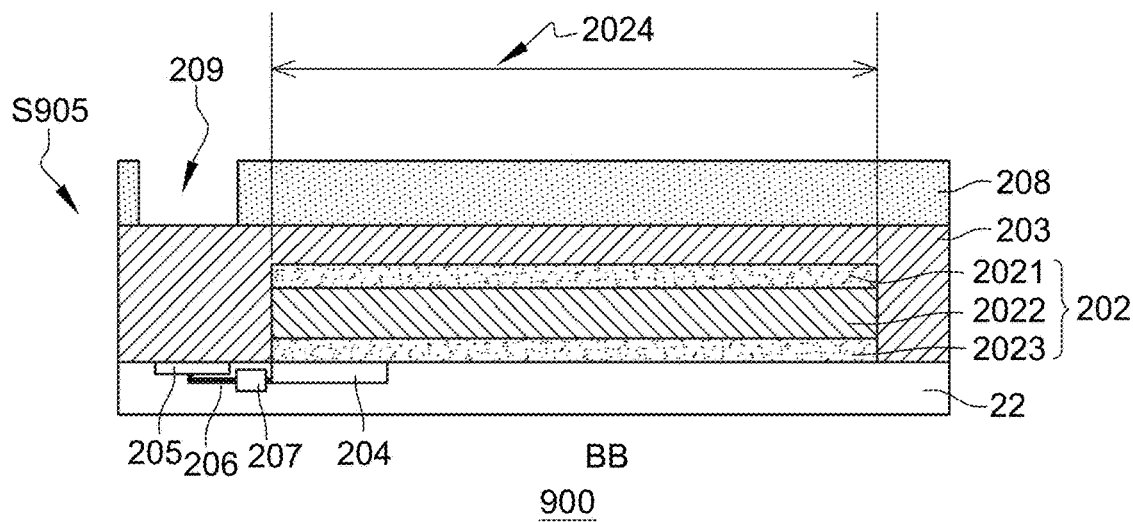

Step S905, illustrated in FIG. 12E, is a step of forming a first aperture 209 through the first sacrificial layer 208 in the zone adjacent to the zone 2024, typically by insolation and development of the photosensitive resin. The aperture 209 opens onto the protective layer 203.

Figure 12F:
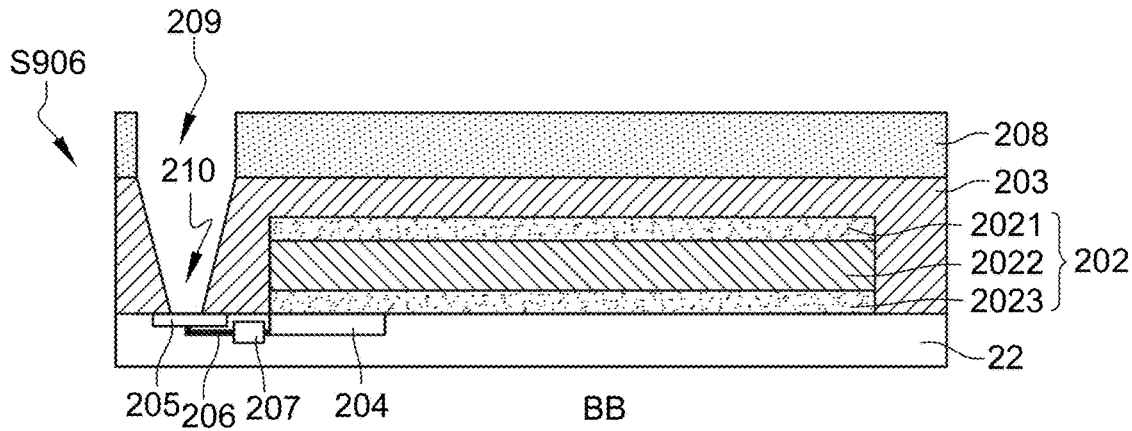

Step S906, illustrated in FIG. 12F, consists in forming a second aperture 210 as an extension of the first aperture 209, to the electronic circuit 22, by vertical etching of the protective layer 203 through the first sacrificial layer 208. In other words, the first sacrificial layer 208 acts as an etching mask.

Figure 12G:
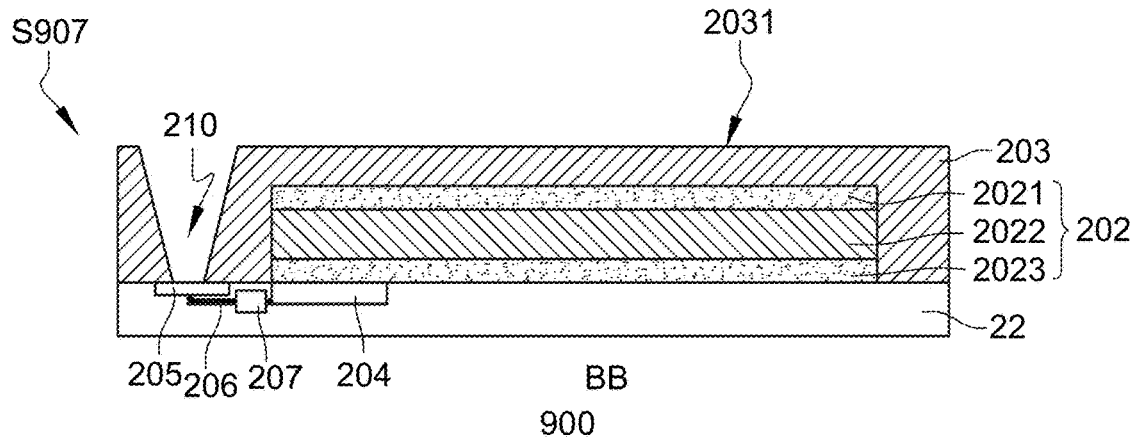

Step S907, illustrated in FIG. 12G, consists in removing the first sacrificial layer 208.

Steps S908, S909, S910, S911 and S912 aim at forming the transparent electrode 201 and the conductive via 211. The transparent electrode 201 and the conductive via 211 are beneficially formed by deposition, photolithography and etching of a single layer of transparent and conductive material 201a.

Figure 12H:
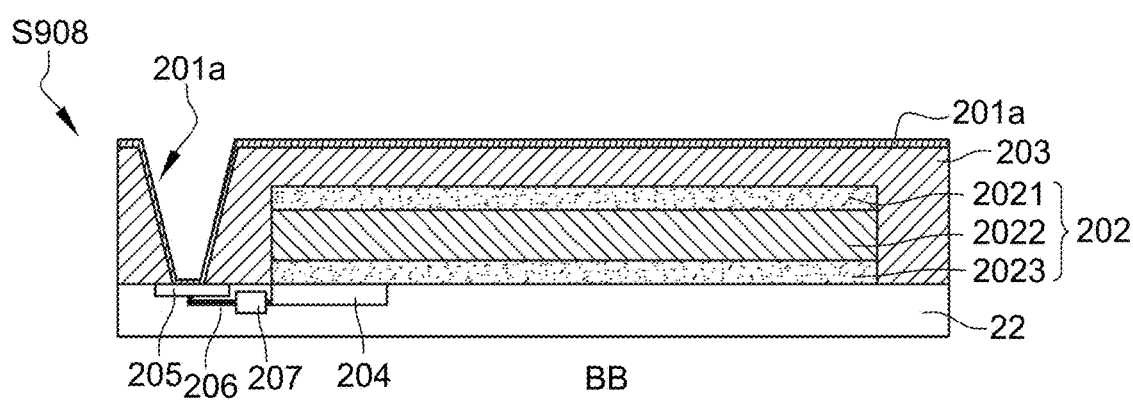

Step S908, illustrated in FIG. 12H, follows step S907 and consists in depositing the transparent and conductive material 201a onto the entire surface 2031 of the protective layer 203 and in the second aperture 210.

Steps S909, S910, S911 and S912 especially aim at delimiting the transparent electrode 201 so that it has the desired shape and dimensions.

Figure 12I:
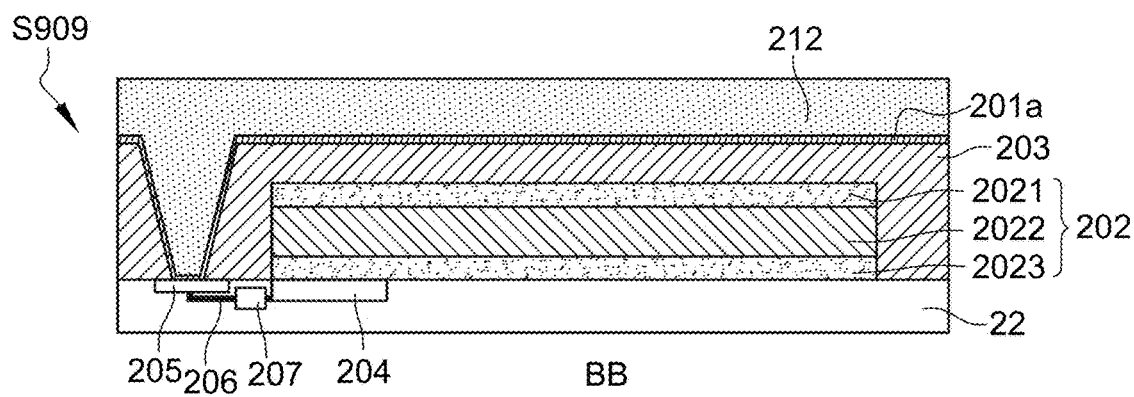

Step S909, illustrated in FIG. 12I, consists in depositing a second sacrificial layer 212 (typically a photosensitive resin layer) onto the layer of conductive and transparent material 201a deposited previously.

Figure 12J:
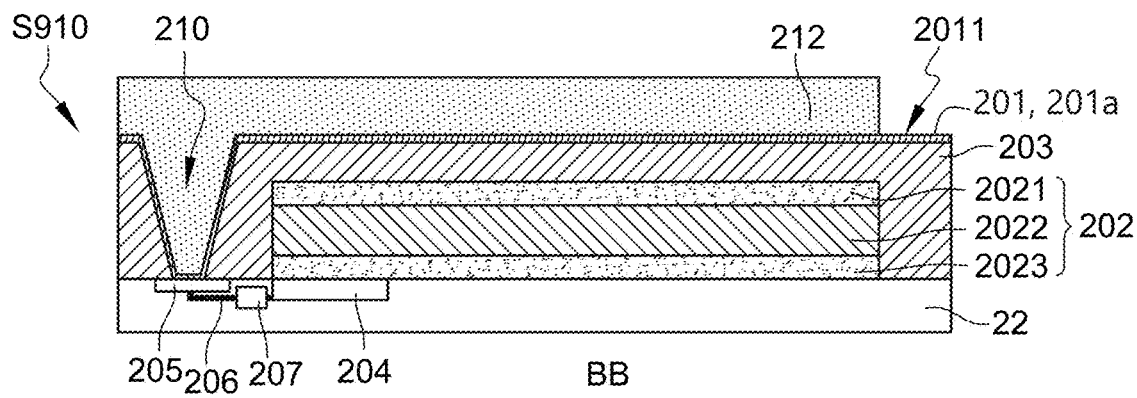

Step S910, illustrated in FIG. 12J, is a step of locally removing the second sacrificial layer 212 (typically by insolation and development of the photosensitive resin). The removal is performed in a zone 2011 located around the zone of the light-emitting element 202.

Figure 12K:
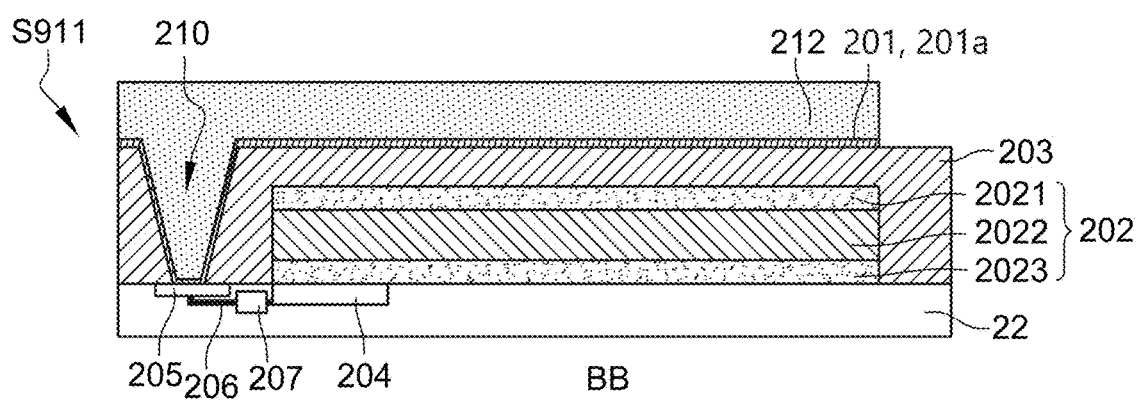

Step S911, illustrated in FIG. 12K, is a step of etching the transparent and conductive material layer 201a through the second sacrificial layer 212 (the second sacrificial layer 212 acts as an etching mask).

Figure 12L:
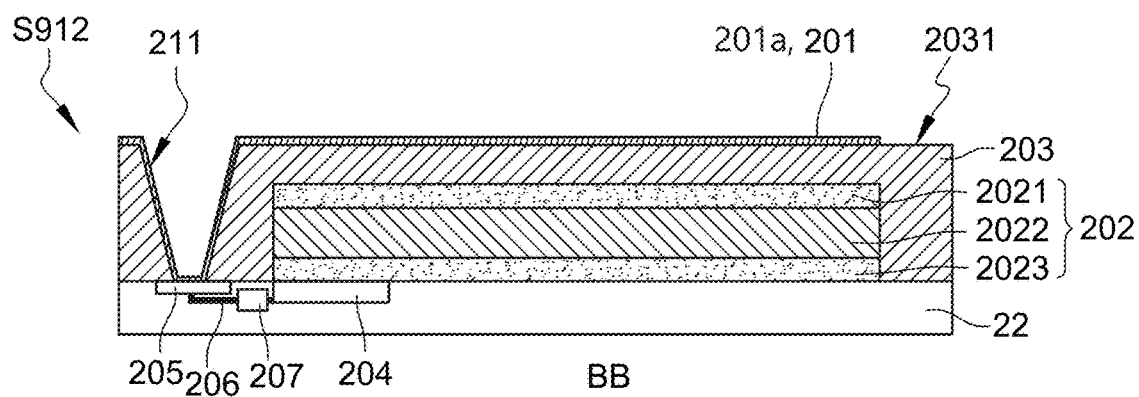

Step S912, illustrated in FIG. 12L, is a step of removing the remaining part of the second sacrificial layer 212. On the protective layer 2031, the conductive and transparent material 201a forms the transparent electrode 201, and on the walls of the second aperture 210, it forms the conductive via 211.

At the end of step S912, the imaging element 20 is formed.

The imaging device 1 may be manufactured according to a manufacturing method derived from the method for manufacturing the imaging element 20 just described.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations. For example, various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. The different characteristics described and/or claimed may be beneficially combined. Their presence in the description or in the different dependent claims do not exclude this possibility. The reference signs cannot be understood as limiting the scope of the invention.

The invention claimed is:

1. An imaging element for analysis of a sample and comprising:
   an electrode adapted to receive the sample,
   a light-emitting element, disposed opposite the electrode, and separated from the electrode by an insulating protective layer,
   a voltage-controlled current source configured to supply current to the light-emitting element and comprising a control electrode electrically connected to the electrode, so that said light-emitting element generates a light wave in response to a voltage coming from the sample.

2. The imaging element according to claim 1, wherein the light-emitting element is disposed between the protective layer and a transparent or semi-transparent support substrate.

3. The imaging element according to claim 1, wherein the electrode and the protective layer are transparent or semi-transparent.

4. The imaging element according to claim 1, wherein the current source comprises a transistor having:
   a gate electrode constituting the control electrode of the current source;
   a source electrode connected to the light-emitting element; and
   a drain electrode connected to a power supply terminal.

5. The imaging element according to claim 4, wherein the transistor is a thin film transistor also known as a TFT.

6. The imaging element according to claim 4, wherein lateral dimensions of the electrode are greater than lateral dimensions of the transistor.

7. The imaging element according to claim 1, wherein the light-emitting element is an organic light-emitting diode.

8. The imaging element according to claim 1, wherein the light-emitting element is an inorganic light-emitting diode.

9. The imaging element according to claim 8, wherein the inorganic light-emitting diode is an inorganic micro light-emitting diode.

10. The imaging element according to claim 1, further comprising an electronic driver circuit configured to generate a control voltage of the current source, said electronic driver circuit electrically connecting the control electrode of the current source and the electrode.

11. The imaging device comprising a plurality of imaging elements according to claim 1.

12. The imaging device according to claim 11, wherein the imaging elements are arranged so as to have a first pitch in a first direction and a second pitch in a second direction intersecting the first direction.

13. A system for imaging a sample comprising:
    an imaging device according to claim 11,
    an image sensor disposed opposite said imaging device and adapted to form
    at least one image of the light wave generated by the imaging device under the effect of the sample,
    a processor adapted to process the image formed by a photodetector.

14. A method for analysing a sample using the imaging device according to claim 11, comprising:
    depositing the sample onto the imaging device so that the sample is in contact with at least one of the electrodes of said imaging device, each electrode in contact belonging to a corresponding imaging element of said imaging device, and optically detecting an electrical activity of the sample, comprising a step of collecting the light wave generated by the light-emitting element of the imaging element corresponding to the electrode in contact, the light wave being generated in response to the voltage coming from the sample.

15. An analysis method according to claim 14, wherein the light wave generated is collected by an image sensor disposed opposite the imaging device, and wherein the collection step is followed by a step of acquiring, by a photodetector, an image representative of the light wave.

16. The analysis method according to claim 15, wherein the step of acquiring the image representative of the light wave is followed by a step of determining the voltage coming from the sample from the image acquired by the photodetector.

17. A method for manufacturing an imaging element for analysis of a sample, comprising:
    providing an electronic circuit comprising a bonding pad and a voltage-controlled current source, the current source comprising a control electrode electrically connected to the bonding pad,
    forming, on the electronic circuit, a light-emitting element,
    forming a transparent or semi-transparent insulating protective layer covering the light-emitting element and the bonding pad,
    forming, on the protective layer and opposite the light-emitting element, a transparent or semi-transparent electrode adapted to receive the sample, and
    forming, through the protective layer, a conductive via extending from the transparent or semi-transparent electrode to the bonding pad.

18. The method according to claim 17, wherein the conductive via and the transparent or semi-transparent electrode are formed from a same material which is conductive and transparent, or conductive and semi-transparent respectively.

* * * * *